United States Patent
Peterschmitt et al.

[11] Patent Number: 6,027,126
[45] Date of Patent: Feb. 22, 2000

[54] METAL GASKET, ESPECIALLY FOR A VALVE DEVICE

[75] Inventors: Jacques Peterschmitt; René Laulhe, both of Villenave D'Ornon; Claude Wattignier, Talence, all of France

[73] Assignee: KSB S.A., Cedex, France

[21] Appl. No.: 08/899,728

[22] Filed: Jul. 24, 1997

[30] Foreign Application Priority Data

Jul. 25, 1996 [FR] France ................................. 96 09378

[51] Int. Cl.[7] .................................................. F16J 15/08
[52] U.S. Cl. .......................................... 277/644; 277/647
[58] Field of Search .................................... 277/650, 647, 277/644; 251/306, 174

[56] References Cited

U.S. PATENT DOCUMENTS

| | | | |
|---|---|---|---|
| 3,282,555 | 11/1966 | Mallonnee, II et al. ................. | 251/84 |
| 3,749,359 | 7/1973 | Montesi ................................... | 251/306 |
| 3,834,663 | 9/1974 | Donnelly ................................ | 251/306 X |
| 4,231,546 | 11/1980 | Eggleston et al. . | |
| 4,303,249 | 12/1981 | Illy ......................................... | 251/306 X |
| 4,750,708 | 6/1988 | Yusko et al. .......................... | 251/315 |
| 4,944,489 | 7/1990 | Adams et al. ......................... | 251/306 |

FOREIGN PATENT DOCUMENTS 0 085 555  1/1983  European Pat. Off. .
2 429 946  6/1979  France .

*Primary Examiner*—Anthony Knight
*Assistant Examiner*—Marcus Dolce
*Attorney, Agent, or Firm*—Knobbe Martens Olson & Bear LLP

[57] ABSTRACT

A metal gasket, with a section comprising a heel (16) to ensure static sealing and a curved part (15) to ensure dynamic sealing, wherein the curved part (15) exhibits a variation in its radius of curvature while retaining the same direction of curvature.

2 Claims, 5 Drawing Sheets

METAL GASKET, ESPECIALLY FOR A VALVE DEVICE

BACKGROUND OF THE INVENTION

1. Technical Field

The invention relates to a gasket for ensuring a static seal on the one hand and a dynamic seal on the other. The gasket is intended, in particular, to ensure sealing up-/downstream of a butterfly valve with sealing member operating under conditions of high pressures and/or temperatures. For such uses, metal gaskets are used which ensure a static seal on the body side and a dynamic seal on the sealing member side, or vice versa.

2. Prior Art

The document FR-B1-2 566 870 comprises several types of gaskets designed to ensure sealing between a sealing member and a body. In FIG. 6 thereof, gaskets are proposed which are machined from a single piece, where a dynamic seal is achieved by a chamfered part resting against the sealing member. FIGS. 2 and 4 show gaskets of sheet metal with solid, relatively rigid back pressure rings. The gasket of sheet metal ensures dynamic sealing by means of a metal ring shaped to create contact stresses which are sufficiently great to withstand high pressures. A static seal is achieved by compression of a resilient torus resting on one of the flat parts of the gasket.

Gaskets make use of the concept of self-centering with respect to the sealing member, in such a way as to maintain the sealing stresses when put under pressure and during closure of the sealing member. Radial flexibility of the machined gasket is obtained by a plurality of machined circumferential grooves. The sheet metal gasket comprises a conical connecting zone between the shaped part of the ring and the heel piece.

However, these gaskets are relatively complex and thus expensive to manufacture.

The document DE-C2-26 44 518 describes a one-piece metal gasket. The gasket has a section in the form of a hook, that is to say a heel to ensure a static seal, a bridging piece and a part in the form of an arc of a circle. The bridging piece may be conical or straight in form and is designed to ensure axial flexibility of the gasket, thus permitting it to follow axial displacement of the sealing member, that is to say along the axis of the fluid course.

From DE-OS-24 54 452 elastomer or metal gaskets are known in the form of hooks. In their toroidal portion the gaskets comprise a lip which rests on the shoulder of a housing to limit radial displacement of the gasket.

These gaskets exhibit the disadvantage of not being uniformly compressed if the sealing member is not precisely centered with respect to the dynamic sealing face of the gasket, that is to say where there is radial displacement along the working axis. Since the gasket is not capable of self-centering, sealing about the sealing member is no longer uniform.

The aim of the invention is to find a simple solution to the problem of making a gasket with self-centering capacity.

SUMMARY OF THE INVENTION

The gasket according to the invention is characterised in that the curved part comprises a variation in its radius of curvature while retaining a single direction of curvature.

With the aid of the invention it is possible to control self-centering of the gasket, for example with respect to a spherical sealing member, by radial flexibility obtained, on the one hand, by an arc of the appropriate characteristics (angle and a radius) and, on the other hand, by the contact pressure of the dynamic seal obtained by selecting an arc of a suitable variable radius and angle.

From the parameterisation of angle and radius, a great variety of possible forms may be obtained which permit stress optimisation of the gasket for small and large diameters.

In comparison to known gaskets capable of self-centering and comprising a back pressure ring, the number of components is reduced while similar functioning is ensured by the curved part alone. Tests have shown that this technical solution may be used even at 50 bar.

In another embodiment, the curved part of the gasket, when mounted, rests against a rigid part of the gasket housing.

Another embodiment provides a straight segment connecting the curved part and the heel and thereby permitting adaptation of the solution to an available space requirement. The straight segment forms an angle of less than 135 degrees with the heel. At the same time, the radial flexibility and thus the self-centering capacity may vary more.

The variation in the radius of curvature may be continuous or discontinuous.

The curved part may be composed of several arcs of circles of at least two different radii connected together.

Setting a parameter of three arcs increases the variety of possible forms whilst abiding by an available space requirement.

The point of contact of the dynamic seal is preferably situated in the first arc of constant radius of the curved part, in both normal and reverse mounting. In this way, sealing performances are maintained, on whichever side the pressure is applied. This is not absolutely necessary, but enables high pressure operation to be maintained.

The gasket preferably has a bearing point situated in a first part of the first arc and/or in a last arc.

A valve device comprising a body, a sealing member and a gasket to ensure sealing up-/downstream between the body and the sealing member, such as a butterfly valve for example, provided with such a metal gasket has the advantage of providing a reliable seal even under extreme conditions of high temperature and/or pressure.

BRIEF DESCRIPTION OF THE FIGURES

The attached drawings illustrate the invention in a butterfly valve.

DETAILED DESCRIPTION OF A PREFERRED EMBODIMENT

Figure 1:
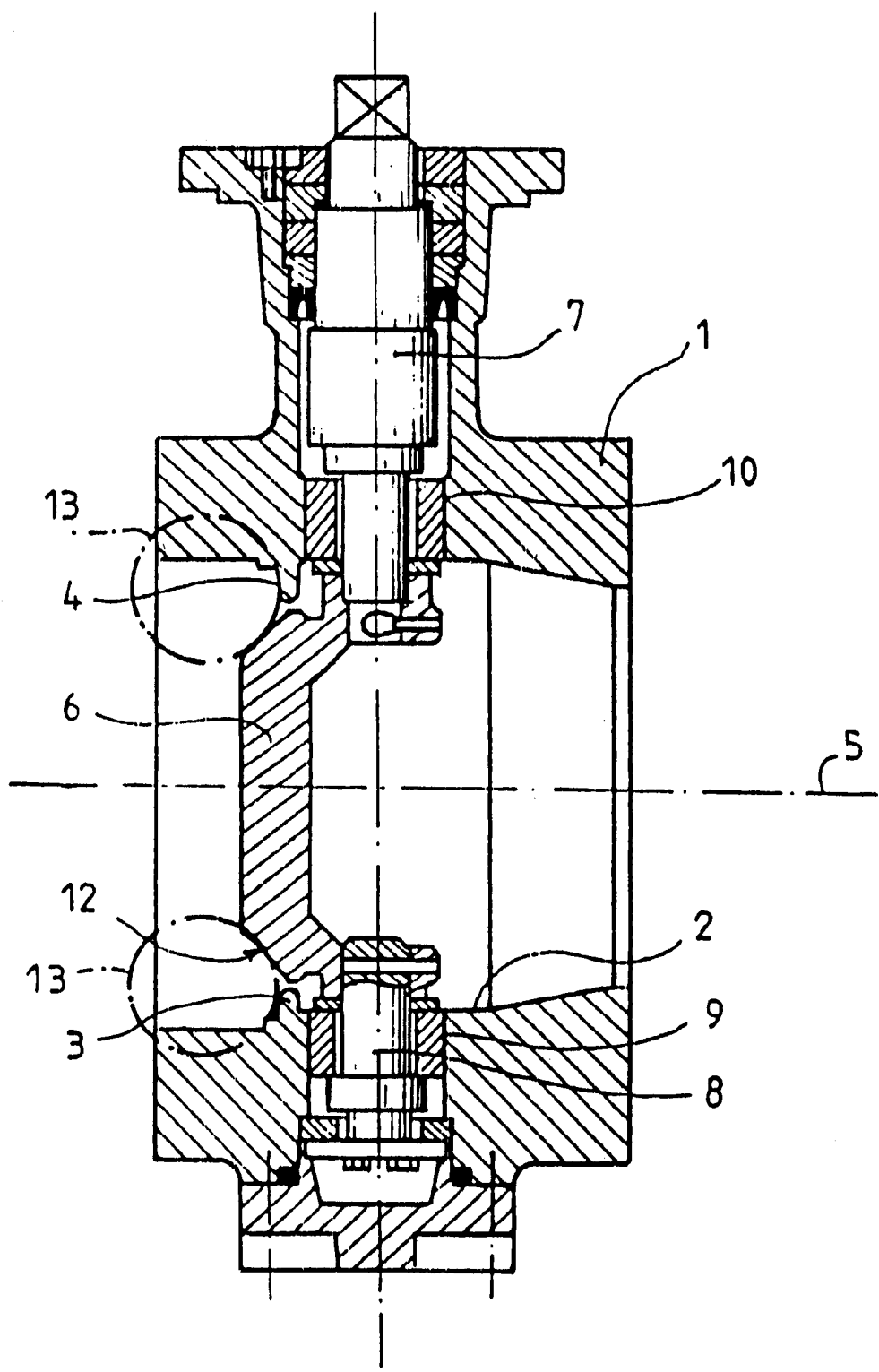
FIG. 1 is a schematic axial section through a butterfly valve capable of being equipped with a sealing device according to the invention.

With reference to FIG. 1, the butterfly valve comprises, in a conventional manner, a body 1 having an axial fluid course 2. The butterfly valve also provides a bore shoulder 3 which includes a support 4 situated in a plane perpendicular to the axis 5 of the fluid course 2. In addition, a butterfly disk 6 is mounted pivotally in the body 1 by means of two shafts 7 and 8 which pass through transverse bores 9,10 in the body 1. The shaft 7 also serves to ensure that the butterfly disk 6 is properly driven when in use.

In this example, the sealing surface 12 of the butterfly disk 6 (consisting of the edge thereof), is spherical in form and centred on the main axis of symmetry of the butterfly disk 6. This shape could equally be a sphere or, more generally, a conoid generated by revolution, that is to say consisting of a curve of revolution, the generating line of which is an appropriate curve.

It should be noted that, when the valve is in the closed position, the sealing surface 12 of the butterfly disk 6 is positioned in front of the opening for a gasket 14 (FIG. 2) which is the space between the shoulder 3 of the body 1 and the flange 17.

As indicated in FIG. 1, the gasket used to achieve sealing up-/downstream of the valve is not shown. A circle 13 is simply shown which corresponds to the various details shown in FIGS. 2 to 10.

Figure 9:
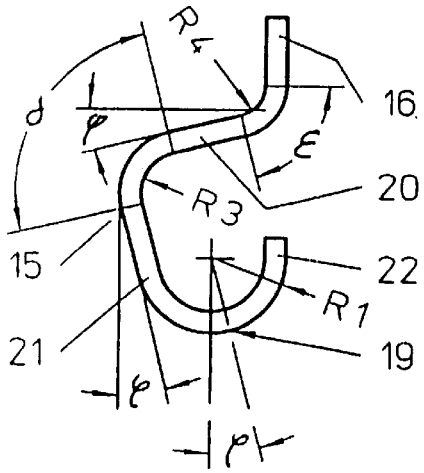
FIG. 9 is a detailed side view illustration of an embodiment of a gasket of the present invention.

As has been mentioned above and illustrated in FIG. 2, up-/downstream sealing is ensured by a gasket 14 of a section comprising a curved dynamic sealing part 15 and a heel 16 in the form of a collar exhibiting a radial flat portion, designed to be held against the support 4 of the bore shoulder 3 of the body 1 with a view to effecting a static seal. The section of the gasket 14 is in the overall form of a hook. As has been mentioned above, and illustrated in FIG. 2, upstream and downstream sealing of a section is ensured by the gasket 14. The gasket 14 comprises two main parts: a first flexible part 15 which is intended to be in contact with the sealing surface 12 when the valve is closed. The flexible part 15 achieves the dynamic tightness of the valve. The flexible part 15 has a complex shape as shown in FIG. 9. The gasket 14 also has a second part 16, which is a static part, in the form of a collar exhibiting a radial flat portion, designed to be held against the support 4 of the bore shoulder 3 of the body 1 with the purpose of effecting a static seal. The section of the gasket 14 is in the overall form of a hook. The perpendicular line to the sealing surface 12 at the point of contact 19 between the part 15 of the gasket 14 and the sealing surface 12, when the valve is closed, forms an angle φ with respect to the operating axis 8.

On this subject it should be noted that, in the embodiments shown in the subsequent Figures, this clamping of the heel 16 is ensured by means of a circular flange 17 held to the body 1 by screws 18.

The contact force exerted by the butterfly disk 6 on the gasket 14 causes deformation of the gasket 14. Under the influence of this deformation the curved part 15 rests against the flange 17 or more generally against a housing support. The point 23 is the point of contact between the flexible part 15 of the gasket 14 and the flange 17 when the valve is closed and the fluid pressure applied on the disc 6 as shown by the arrow P (FIG. 2).

Similarly, the flexible part 15 of the gasket 14 may be pressed against the support 4 of the body 1 when the fluid pressure P is applied in the opposite direction.

Figure 2:
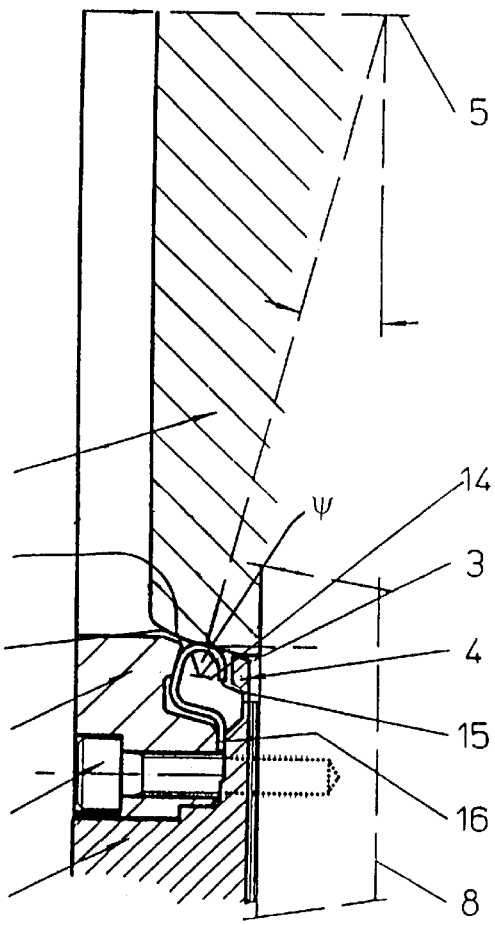
FIG. 2 is a sectional view of part of a butterfly valve provided with a gasket according to the invention.
Figures 3, 4:
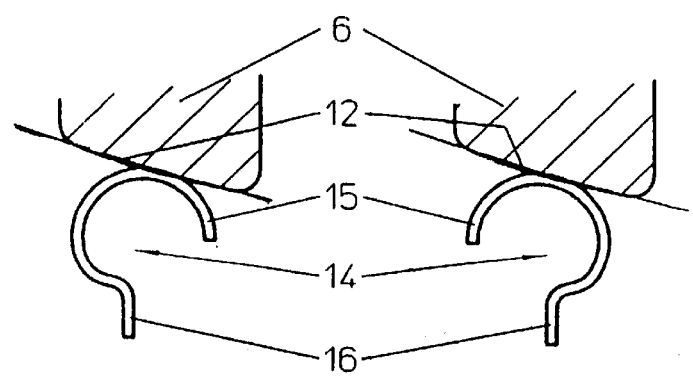
FIG. 3 is a sectional view of an enlargement of the region of dynamic sealing and the gasket mounted in the normal direction.
FIG. 4 is a sectional view of an enlargement as in FIG. 3, the gasket being mounted in the reverse direction.

In FIG. 3 the gasket 14 is mounted in the normal direction as shown in FIGS. 2 and 3, wherein the open part of the gasket is oriented towards the shaft 8. FIG. 4 illustrates an embodiment wherein the gasket is mounted in the reverse direction wherein the open part of the gasket 14 is oriented away from the shaft 8. The sealing surface 12 comes into contact with the gasket on the open side (normal direction) or the closed side (reverse direction) of the gasket.

Figure 5:
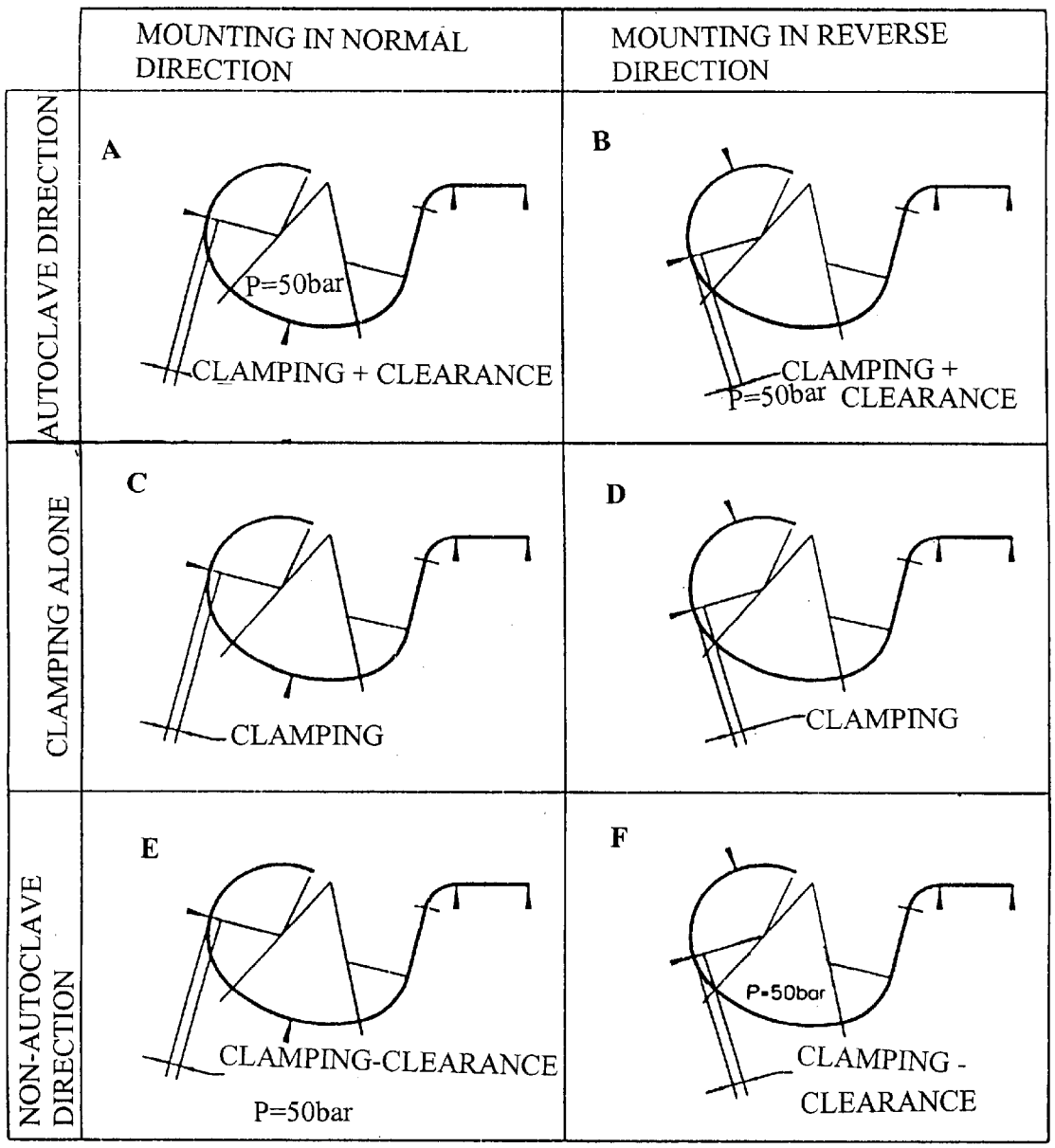
FIG. 5 shows ways of mounting and loading the gasket.

FIG. 5 is a schematic representation of the six main stress configurations of the gasket 14 related to the mounting direction and the fluid pressure direction.

Figure 6:
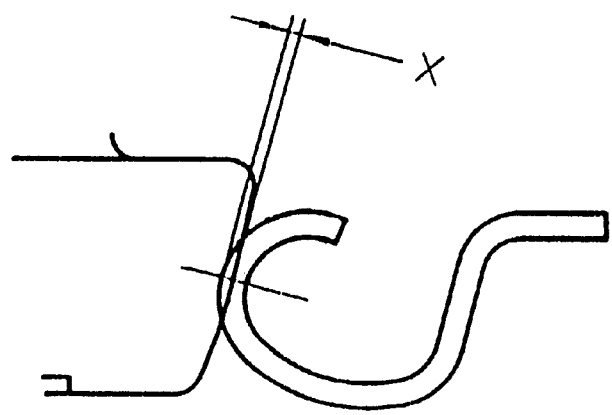
FIG. 6 is a side view of a gasket and a sealing member within a valve. In this embodiment, the valve is closed without any additional pressure.
Figure 7:
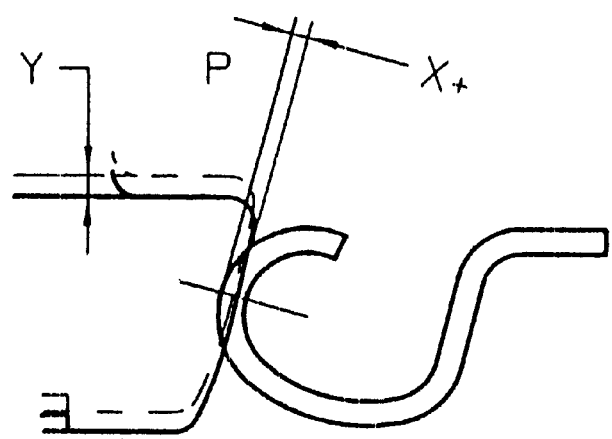
FIG. 7 is a side view of a gasket and a sealing member wherein the valve is closed subject to a pressure of 50 bar on the opened side of the curved part of the gasket.
Figure 8:
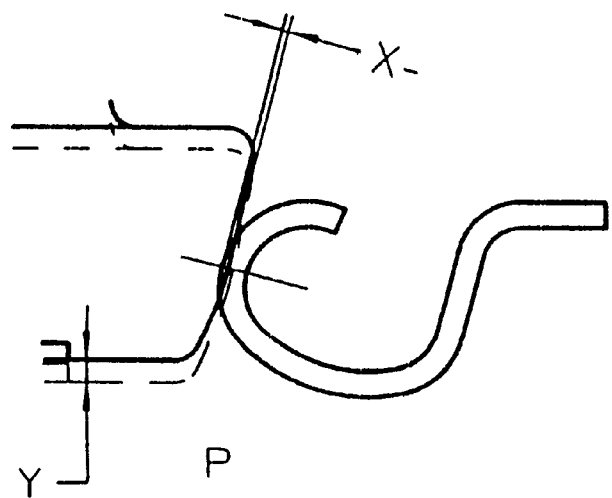
FIG. 8 is a side view of a gasket and sealing member wherein the valve is subjected to pressure on the closed side of the curved part of the gasket.

FIGS. 6 to 8 show the difference in stress at the point of gasket/sealing member contact in accordance with the type of loading for a gasket mounted in the normal direction.

Loading caused solely by clamping (sealing member closed under pressure), as shown in FIG. 6, corresponds to closure of the valve without any additional pressure. The gasket is subjected to clamping of the value X by penetration of the sealing member, which creates a deformation stress. Deformation of the gasket is effected on its free part, that is to say its curved part, because the heel acts as a fixed bearing.

The autoclave loading shown in FIG. 7 corresponds to subjecting the valve to a pressure P of 50 bar on the open side of the curved part of the gasket. As is known in the art, autoclave loading is a test system whereby a higher pressure exerted on the valve causes the valve to have a greater tightness level. Owing to the pressure applied on one side and the manufacturing clearances, the sealing member is displaced by a distance and thus penetrates more into the gasket. This displacement of the sealing member has the effect of compressing the curved part still more by a distance $X^+$, which increases the deformation stress. The contact pressure increases and the sealing pressure also increases.

The non-autoclave loading shown in FIG. 8 corresponds to subjecting the valve to pressure on the closed side of the curved part 15 of the gasket. As is known in the art, non-autoclave loading is a test system whereby a higher pressure exerted on the valve results in the valve having a lower tightness level. As indicated by dotted lines, the sealing member moves by a distance Y and compresses the gasket by a value $X^-$. This displacement translates into a decrease in the clamping force.

The dimensions of the gasket must take these effects into account to ensure reliable sealing whatever the direction of mounting while at the same time preventing irreversible plastic deformation of the gasket.

FIG. 9 shows a gasket 14 in detail. A flat, static sealing part known as a heel 16 is combined with a flexible part 15 intended for dynamic sealing.

Connection of the static sealing part and the dynamic sealing part is effected by a curve of the radius $R_4$. A minimum value for this radius $R_4$ is inevitably imposed by the method of manufacturing the gasket. This value is generally approximately 1 to 2 mm. The angle ε is important in influencing the self-centering capacity. This angle ε is between 45 and 90 degrees. In the embodiment shown, the angle ε is 90 degrees minus φ. This dimensioning positions a straight segment 20 adjacent the curve of radius $R_4$ so as to be substantially perpendicular to the direction of deformation of the flexible part 15 resulting from the penetration of the sealing member. The straight segment 20 forms an angle of a maximum of 135 degrees with the heel 16. The straight segment 20 is followed by a curve of the radius $R_3$ extending over an angle of 90 degrees. This has the effect of orienting the straight segment 21 in parallel with the perpendicular line to the sealing surface 12 of the point of contact 19 (which is one side of the angle φ, with the other side of the angle φ being parallel to the shaft axis 8.). It is on this face of the segment 21 that the gasket rests against the flange 17 at the point of contact shown in FIG. 2.

Thereafter, there is a curve of the radius $R_1$ extending over an angle of 180 degrees minus φ and ending in a straight segment 22 parallel with the working axis 8. The point of contact 19 is located in this curve $R_1$.

Figure 10:
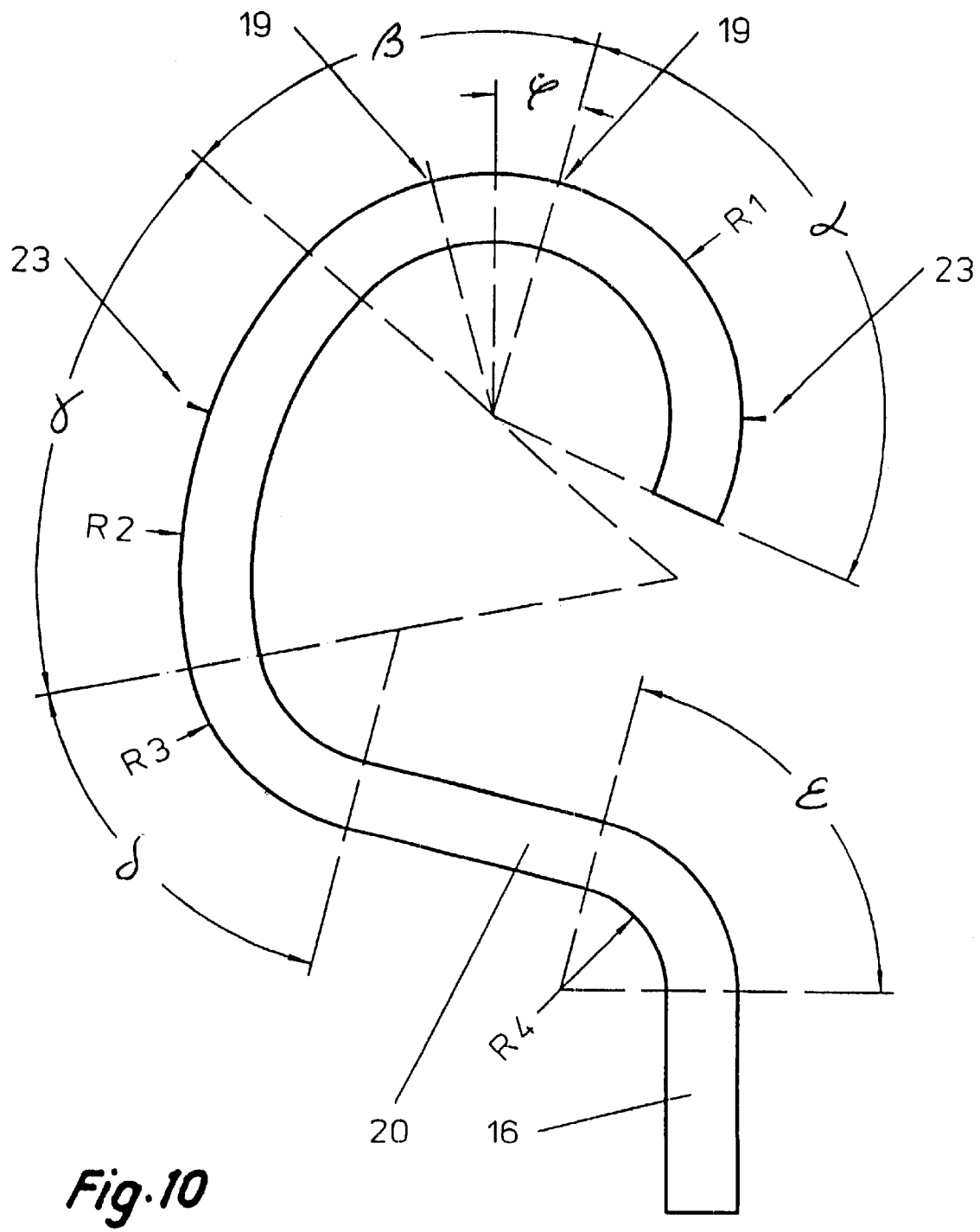
FIG. 10 is an alternate embodiment of the gasket of the present invention having an additional curve of the radius $R_2$.

FIG. 10 shows another embodiment with an additional curve of the radius $R_2$.

This gasket has a curved part consisting of three arcs α+β, γ, δ with at least two different radii selected from $R_1$, $R_2$, $R_3$. The connection between the curved part and the heel 16 is effected by an arc ε of the radius $R_4$. The curved part has a straight segment 20 of a length suited to the conditions of the space available in the gasket housing. This length may become zero for certain selections of radii $R_1$, $R_2$, $R_3$.

The bearing point 23 against the housing in the case of mounting in the normal direction is located on the arc γ of radius $R_2$, indicated by the support.

The first point of contact 19 between the butterfly disk and the seat is positioned on the arc α+β of radius $R_1$. In the case of mounting in the normal direction, it is at an angular distance α from the end of the gasket and at an angular distance φ from an axis perpendicular to the central axis passing through the centre of the arc α+β. This angle φ corresponds to the angle φ of FIG. 2. The arc α+β of radius $R_1$ is composed of the two angles α and β defined with respect to the angle φ.

The second point of contact 19' in the case of mounting in the reverse direction is situated in the arc β at 2 φ from the arc α. In this instance, the bearing point 23' against the housing is situated in the arc α close to the end of the gasket.

It is possible to make the sheet metal gasket by stamping, flow forming or metal spinning owing to the constant thickness and open shape of the section.

Industrial application

The gasket according to the invention may be used or static sealing nd dynamic sealing in valves etc., for example to achieve the tightness of a quarter-turn valve like a butterfly valive.

What is claimed is:

1. A valve device comprising:

a body;

a support secured to the body;

a sealing member; and a metal gasket for ensuring upstream and downstream sealing between the body and the sealing member, wherein the gasket has a heel clamped between the body and the support for ensuring static sealing, and wherein the gasket further comprises a flexible part which is movable between the body and the support for ensuring dynamic sealing and wherein the flexible part exhibits a variation in its radius of curvature while retaining a single direction of curvature, wherein the flexible part is composed of a first arc with a constant radius, a second arc with a constant radius and a third arc with a constant radius, and wherein on the first arc there is positioned a first point of contact of dynamic sealing, and wherein on said first arc there is also a second point of contact of dynamic sealing when the gasket is mounted in an opposite direction.

2. The device according to claim 1, wherein the flexible part and the heel are connected by a straight segment forming an angle of less than 135 degrees with the heel.

* * * * *